United States Patent
Yun et al.

(10) Patent No.: US 6,791,992 B1
(45) Date of Patent: Sep. 14, 2004

(54) EARLIEST-DEADLINE-FIRST QUEUING CELL SWITCHING ARCHITECTURE AND METHOD

(75) Inventors: Kenneth Y. Yun, San Diego, CA (US); Kevin W. James, San Diego, CA (US)

(73) Assignee: The Regents of the University of California, LaJolla, CA (US)

( * ) Notice: Subject to any disclaimer, the term of this patent is extended or adjusted under 35 U.S.C. 154(b) by 728 days.

(21) Appl. No.: 09/586,812

(22) Filed: Jun. 5, 2000

Related U.S. Application Data

(60) Provisional application No. 60/158,084, filed on Oct. 7, 1999.

(51) Int. Cl.[7] .............................................. H04L 12/28
(52) U.S. Cl. ........................ 370/415; 370/461; 370/462
(58) Field of Search ................................ 370/415, 416, 370/417, 418, 413, 447, 414, 429, 390, 399, 230.1, 235.1, 233, 235, 229, 230, 395.1, 395.4, 461, 462

(56) References Cited

U.S. PATENT DOCUMENTS

| | | | | |
|---|---|---|---|---|
| 5,517,495 A | * | 5/1996 | Lund et al. .................. | 370/399 |
| 6,009,077 A | * | 12/1999 | Firoiu et al. ................ | 370/230 |
| 6,072,772 A | * | 6/2000 | Charny et al. .............. | 370/229 |
| 6,088,734 A | * | 7/2000 | Martin et al. ............... | 709/232 |
| 6,442,166 B1 | * | 8/2002 | McDonald et al. .... | 370/395.42 |
| 6,532,213 B1 | * | 3/2003 | Chiussi et al. ........... | 370/230.1 |

OTHER PUBLICATIONS

B. Prabhakar, N. McKeown, R. Ahuja, "Multicast Scheduling for Input–Queued Switches".
N. McKeown, B. Prabhakar, M. Zhu, Matching Output Queueing with Combined Input and Output Queueing.
A. Mekkittikul, N. McKeown, "A Practical Scheduling Algorithm to Achieve 100% Throughtput in Input–Queued Switches".
B. Prabhakar, "On the Speedup Required for Combined Input and Output Queued Switching".
S.T. Chuang, A. Goel, N. McKeown, B. Prabhakar, "Matching Output Queueing with a Combined Input and Output Queued Switch".
N. McKeown, "The iSLIP Scheduling Algorithm for Input–Queued Switches".

(List continued on next page.)

*Primary Examiner*—Chi Pham
*Assistant Examiner*—Alexander O. Boakye
(74) *Attorney, Agent, or Firm*—Greer, Burns & Crain, Ltd.

(57) ABSTRACT

The cell switching architecture of the present invention uses at least one earliest deadline first (EDF) queue for each of the output ports in a cell switch so that no two output ports have a common earliest-deadline-first queue. Cells are arranged in each EDF queue according to deadline, but each EDF queue only contains cells for a single destination output port. Each input port also has an input queue with an EDF queue for each of the output ports, and each EDF queue arranges the cells for a single output port. Many equivalent cells may be represented by a single EDF queue entry, enabling large buffer capacity to be supported by small EDF queues. The architecture provides a method for switching cells between a plurality of input ports and a plurality of output ports. Cells are accepted from input ports into a plurality of corresponding input queues. Cells are sorted into groups according to the destination output port such that each group includes cells destined for a single output port. Within each input queue, at least one group is formed for every output port for which cells are available. Cells are arranged, within each group, according to deadline. By means of a central arbiter, output ports then choose cells to read in a read cycle from the earliest deadline cells in their corresponding cell groups in the input queues. An efficient method is used to select cells with the earliest deadlines.

14 Claims, 7 Drawing Sheets

OTHER PUBLICATIONS

N. McKeown, P. Varaiya, J. Walrand, "Scheduling Cells in an Input–Queued Switch".

N.W. McKeown, "Scheduling Algorithms for Input–Queued Cell Switches" thesis, submitted in partial completion of E.E. doctoral requirement at U. of C., Berkeley.

A. Hung, G. Kesidis, N. McKeown, "ATM Input–Buffered Switches with the Guaranteed–Rate Property".

G. Kesidis, N. McKeown, "Output–Buffer ATM Packet Switching for Integrated–Services Cmmunication Networks".

Y. Joo, N. McKeown, "Doubling Memory Bandwidth for Network Buffers".

J.S. Turner, "A Gigait Local ATM Testbed for Multimedia Applications", Gigabit Switching Technology, Aug. 27, 1998.

J.S. Turner, "Terabit Burst Switching", Jul. 17, 1998.

Q. Bian, K. Shiomoto, J. Turner, "Dynamic Flow Switching", Proceedings of Infocom, Mar. 1998.

K.W. James, K.Y. Yun, "Supporting Quality of Service in a Terabit Switch".

K.W. James, K.Y. Yun, "Supporting Quality of Service in a Terabit Switch", Paper No. 2.

"A 41Gb/s EDF Packet Switching Architecture" slides, Kenneth Yun, Kevin James.

K.W. James, K.Y. Yun, "A 40 Gb/s Packet Switching Architecture with Fine–Grained Priorities", Paper No. 1.

Contents of "The Journal of High Speed Networks", vol. 8, 1999.

H.J. Chao, B.S. Choe, "Design and Analysis of a Large–Scale Multicast Output Buffered ATM Switch", Apr. 1995.

H. Saidi, P.S. Min, M.V. Hegde, "A Nonblocking Architecture for Broadband Multichannel Switching", Apr. 1995.

"Advances in ATM Switching Systems for B–ISDN", IEEE Journal on Selected Areas in Communications.

"Next Generation IP Switches and Routers", IEEE Journal on Selected Areas in Communications.

H.J. Chao, N. Uzun, "An ATM Routing and Concentration Chip for a Scalable Multicast ATM Switch".

N. McKeown, M. Izzard, A. Mekkittikul, W. Ellersick, M. Horowitz, "The Tiny Tera: A Packet Switch Core".

N. McKeown, T.E. Anderson, "A Quantitative Comparison of Scheduling Algorithms for Input–Queued Switches".

M. McKeown, V. Anantharam, J. Walrand, "Achieving 100% Throughput in an Input–Queued Switch".

N. McKeown, B. Prabhakar, "Scheduling Multicast Cells in an Input–Queued Switch".

A. Mekkittikul, N. McKeown, A Starvation–free algorithm for Achieving 100% Throughput in an Input–Queued Switch.

* cited by examiner

EARLIEST-DEADLINE-FIRST QUEUING CELL SWITCHING ARCHITECTURE AND METHOD

REFERENCE TO RELATED APPLICATION AND CLAIM OF PRIORITY

Priority is claimed under 35 U.S.C. §119 from prior provisional application to Yun et al., Ser. No. 60/158,084, filed Oct. 7, 1999, entitled "Scalable Terabit Switch Design with 40GBPS Link Rate and Mechanisms to Support Earlliest-Deadline-First Scheduling in the Said Switch".

FIELD OF THE INVENTION

The invention is generally applicable to cell switched networks. The invention specifically concerns a switch architecture for organizing and controlling the flow of cells between a plurality of input ports and output ports.

BACKGROUND OF THE INVENTION

Cell switched networks permit sharing of available communication bandwidth by multiple data sets having different sources and destinations. In contrast to circuit switching theory, where a connection is dedicated for communication between a source and destination, cell switching theory allows a connection resource to be used by multiple sources and destinations. This requires breaking data sets into discrete cells, which are then reassembled at the destination. Cells must contend for available bandwidth during transmission from a source to a destination. Such transmission bandwidth is typically allocated and controlled by a cell switch.

High speed communication media, e.g., optical fiber, are typically used in cell switched networks. A cell switch therefore has the potential to become, and does become in practice, the point of bottleneck in a cell switched network. High speed cell switches are therefore required to utilize the available bandwidth of the communication media. High speed cell switches must meet conflicting requirements in terms of service guarantees and resource (bandwidth) utilization. Real-time and interactive applications, such as terminal emulation, multimedia, and tele-presence, require various network guarantees on parameters such as latency, throughput, and loss rate. Some of these applications require low latency but do not require high throughput.

Fast cell switching is a technique to communicate a message between a source endpoint and a destination endpoint of a switching network using a series of information passing elements. One or more fast cell switches are used for transmission between the two endpoints. Data transmissions are now evolving with a specific focus on applications with varying network service demands. As a result, high-speed cell switches must be able to satisfy network service guarantees without sacrificing resource utilization. In a connection-oriented environment, switch resources are reserved to accommodate service guarantees. Resources, in this context, include transmission bandwidth and buffer space.

However, this is often not the most efficient use of the network resources. Conventionally, statistical multiplexing is used to increase resource utilization. Essentially, the bandwidth and buffer reservations reflect the average throughput rate, but the aggregate peak rates of all the admitted connections generally exceeds the capacity of the switch. The problem is that cells do not arrive at regular intervals. Rather, a source sends a burst of cells followed by an idle period. This type of traffic is referred to as bursty, which has significant implications on the behavior of the switch. When two sources send cells to the same destination, there is contention for the destination port. As a result, one or more cells must be buffered or discarded. When bursty traffic patterns exist, contention may persist for many cell cycles which in turn causes many cells to be buffered. This model contrasts sharply with the traditional assumption that arrivals are independent (not bursty). Under this traditional model, very small buffers are sufficient to prevent loss. In fact, however, bursty traffic necessitates large buffers. Accordingly, a switch must have sufficiently large buffers to accommodate bursty traffic and thereby minimize the loss rate, while simultaneously ensuring timely delivery of the cells.

Various cell buffering techniques exist in the prior art. One conventional technique relies on first-in-first-out (FIFO) queues. While this technique is fast and simple to implement in shared memory buffers, it is not adequate for efficient provision of guaranteed service. As used in this sense, "guaranteed service" means cell transmission characterized by guaranteed levels of latency and loss rate. One way that the FIFO queue may partially meet the demand of network service guarantees is by making the network very fast so that the offered load is always low. This minimizes the degree of queuing, thereby minimizing the queuing delay. Because the demand for network bandwidth is constantly increasing over time, the increased speed of the infrastructure is unlikely to yield acceptable performance in the long run. The demand will eventually rise to the point that contentions are unavoidable in the system, causing large numbers of cells to be stored. Although large FIFO buffers can withstand periods of contention, all cells are nevertheless subject to potentially significant delay. A tradeoff between loss-rate and delay is inevitable when using FIFO queues. FIFO queuing is also unable to protect one traffic stream from another. Furthermore, random cells are lost when a FIFO queue overflows. As a result, contentions must be handled intelligently for acceptable real time performance and to avoid degrading the quality of service afforded to important traffic. For example, it should be possible to schedule important or late-arriving traffic to be transmitted with minimal delay relative to other competing traffic.

A modified FIFO arrangement known in the art provides some service differentiation by replacing each individual FIFO queue with several FIFO queues. Each FIFO queue is used for a particular traffic class, i.e., deadline or priority. However, this solution is inadequate for a wide range of traffic classes due to its small number of priority levels. It is similarly unable to isolate traffic streams of the same class.

Thus, there is a need for an improved cell switching architecture which addresses some or all of the aforementioned difficulties. It is an object of the invention to provide such an improved cell switching architecture.

SUMMARY OF THE INVENTION

These and other needs are met or exceeded by the present cell switching architecture. According to the cell switching architecture of the present invention, there is an input queue for each input port. Furthermore, within each input queue, there is at least one earliest-deadline-first (EDF) queue for each of the output ports so that no two output ports share a common EDF queue. Cells are arranged in each EDF queue according to deadlines, but each EDF queue handles only cells for a single destination output port for a particular input port. In other words, each EDF queue arranges the cells for a single output port.

The architecture provides a method for switching cells between a plurality of input ports and a plurality of output ports. Cells are accepted from input ports into a plurality of corresponding input queues. Cells are sorted into groups according to the destination output port such that each group includes cells destined for a single output port. Within each input queue, at least one group is formed for every output port for which cells are available. Cells within the group are arranged according to deadlines, earliest deadline first. Transmission control directs the earliest deadline cell for a given output port to be transmitted in a particular cycle. Arbitration is implemented to avoid conflicts between input queues transmitting cells in a given cycle.

BRIEF DESCRIPTION OF THE DRAWINGS

Other features, advantages and objects of the invention will be readily apparent to those skilled in the art by reference to the detailed description and drawings, of which.

DETAILED DESCRIPTION OF THE PREFERRED EMBODIMENT

The present invention relates generally to a cell switching architecture for efficiently scheduling cells in such a manner that network service guarantees are met when contention arises, and under conditions of high bandwidth utilization (offered load). According to the present invention, each input port has an input queue with at least one earliest-deadline-first (EDF) queue for each of the output ports. Each EDF queue arranges the cells according to deadline for a single output port. Deadline, as used herein, encompasses eligibility, i.e., an indication that a cell should not be transmitted until a certain time, as well as indications which require transmission of a cell by a certain time. The architecture of having EDF queues handling cells for output ports provides more scheduling flexibility. The number of potential deadlines is limited only by the number of bits available for coding deadline information, and is not a function of the architecture itself. Millions of deadlines can be supported. Accordingly, considerably more scheduling flexibility is provided for handling non-deterministic and non-uniform time-varying traffic flows.

The cell switching architecture of the invention uses existing "virtual output queuing" to prevent head-of-line blocking. Using this technique, cells destined for a blocked output port do not block cells destined for other output ports. The invention improves the existing virtual output queuing by use of EDF queues. Each EDF queue handles cells for a single destination output port for a particular input port and arranges cells according to deadline. The present cell switch architecture is capable of yielding large buffer capacity while using relatively short queues. The present cell switching architecture balances the conflicting requirements between applications using network guaranteed services and efficient switch resource utilization. It also will provide quality service with minimal delays for high-priority traffic during periods of contention when bursty arrivals consume a large amount of switch resources. The present cell switching architecture provides a queue architecture that is scalable, and which widens its applicability to various network environments. Artisans will appreciate these and other advantages arising from the present cell switching architecture.

Figure 1:
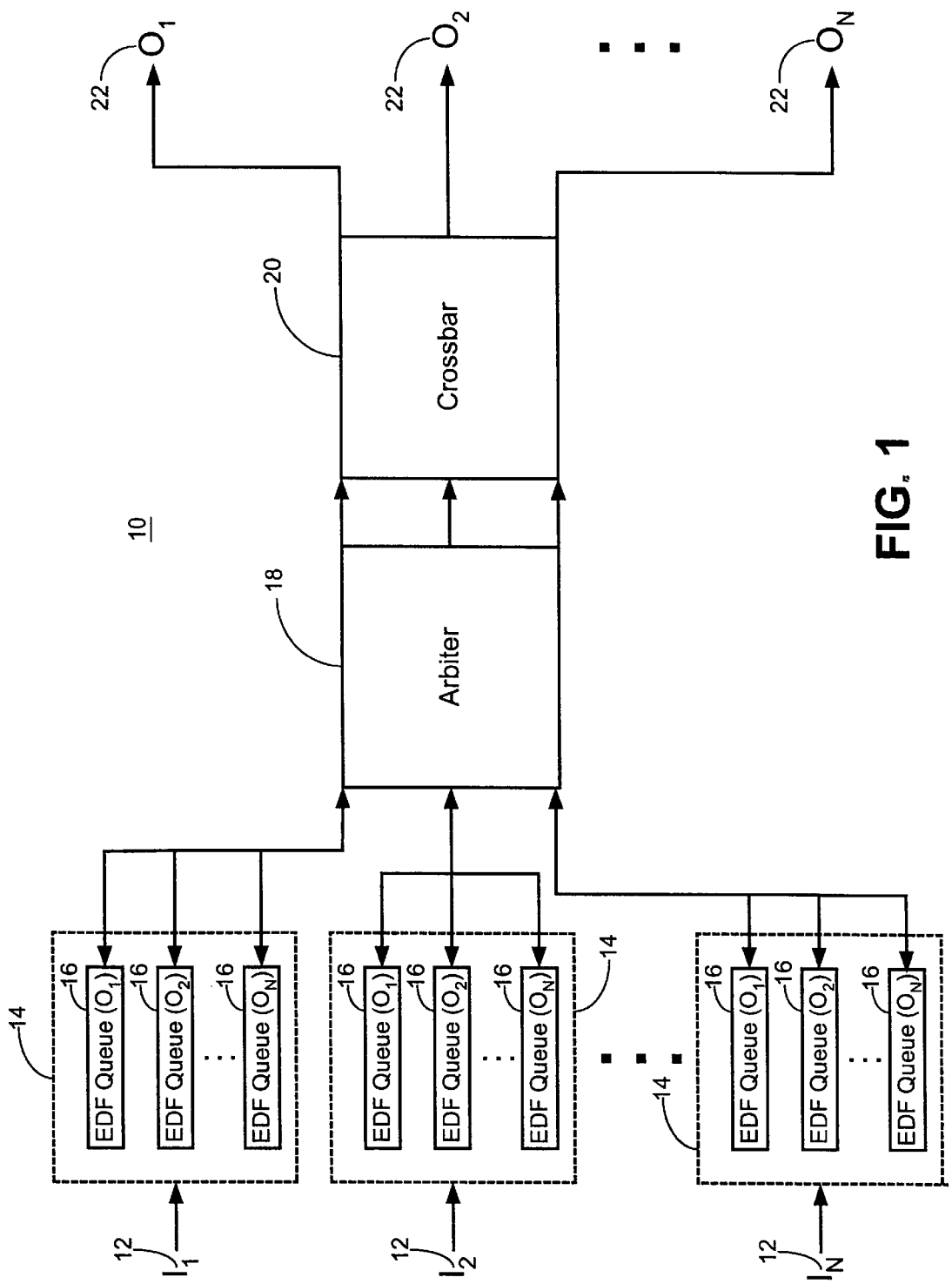
FIG. 1 is a block diagram illustrating the input earliest-deadline-first (EDF) queue arrangement of the invention for an exemplary N×N switch.

Referring now to FIG. 1, the input queued earliest-deadline-first ("EDF") switch architecture of the invention is illustrated for a N×N switch as an example and is generally indicated as 10. Any M×N switch, where M may or may not equal N and N is greater than one, may utilize the invention. The conceptual flow of cells is from input ports 12, into respective input queues 14. Cells are then grouped into EDF queues 16 according to their destination. Within each EDF queue 16, cells are arranged by deadlines. This arrangement of cells according to the invention prevents head of line blocking. In such an arrangement, as shown in FIG. 1, each input port 12 has an input queue 14 having at least one EDF queue 16 per output port 22. Each EDF queue 16 handles cells for its designated output port 22. The structure of one EDF queue per output port prevents a conflict on one output port from blocking traffic to another output port. Cells arranged in the head of EDF queues for a common output port compete for transmission in a given transmission cycle. Any suitable arbitration technique prevents conflict.

In a preferred embodiment, the cells with the earliest deadline at each of the EDF queues 16 corresponding to a given destination port mutually compete for transmission to such destination port. Such competition is arbitrated by a central arbiter 18, which selects the cell with the earliest possible deadline for each output port 22. Once the arbiter 18 selects a cell for transmission to an output port 22, that particular output port 22 is blocked until either a cell bids with an earlier deadline or the cell holding the lock releases the outport port 22.

In the preferred embodiment the central arbiter 18 permits each input queue 14 to bid only for a specified output port during each given cycle to reduce arbitration complexity. However, the selected cell bids for access to an output port 22 if and only if the cell has an earlier deadline than the cell that is currently being transmitted from the input queue to a different output port. This preferred arbitration process ensures that the output ports 22 are unique for each cell selected for transmission in a given cycle. The bid-winning cells are then switched through a conventional crossbar fabric 20 to output ports 22.

In a preferred implementation, the EDF queues 16 store representations of cells rather than the cells themselves. In this way a common memory is used for storing cells. When cells arrive from the input ports 12, an input buffer (not shown in FIG. 1) receives and stores the cells in memory. The input buffer may comprise a single memory shared by different EDF queues 16. Static random access memory ("SRAM") is preferred for the input buffer.

The input buffer (28 in FIGS. 2 and 4) is preferably partitioned into "slots," each of which holds one cell. After a cell is stored in an input buffer slot, a representation of the cell is created, including a pointer to its slot in memory, the cell's deadline level, and the cell's destination output port. The representation is then pushed into an EDF queue that matches the cell's destination output port. Within the EDF queue 16, the pointers are arranged according to deadlines wherein the earliest deadline pointer is placed at the head of the EDF queue and is available for immediate dispatch. Cells selected for transmission are read from input buffers and forwarded to appropriate ones of the output ports 22 by the crossbar 20.

As is further described below with reference to FIG. 2, the preferred embodiment also uses cell ensembles, with an ensemble being a single representation of multiple cells in an EDF queue. Use of a single representation for multiple cells allows for smaller size EDF queues. The single representation is used for multiple cells in a single EDF queue 16 that have a common destination port and a common deadline. Ensembles take advantage of bursty communications, which demonstrate high temporal correlation in that the appearance of one cell frequently implies that additional related cells will arrive in the near term.

Figure 2:
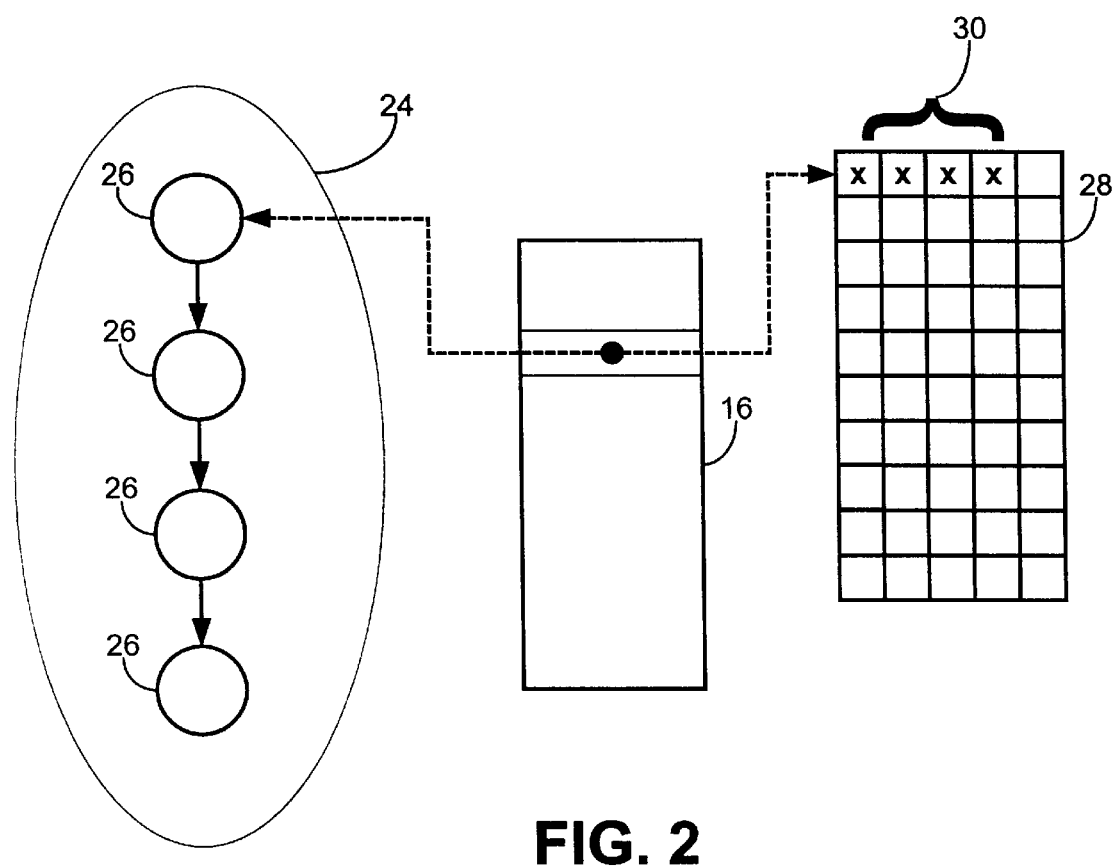
FIG. 2 is a block diagram illustrating cell burst compression of the preferred embodiment of the present invention.

FIG. 2 shows an exemplary block diagram representation of ensemble cell burst compression in accordance with the preferred embodiment of the present invention. In FIG. 2, a burst of cells 26 with the same destination and deadline is compressed into a single ensemble 24. In accordance with the preferred embodiment, the same queue entry will be used for multiple cells having a common deadline in a single EDF queue. Accordingly, in the example of FIG. 2 each of four cells 26 having the same destination and deadline is represented by a single queue entry. In the memory 28, locations 30 of an ensemble are preferably linked. In the FIG. 2 example, four cells 26 remain stored in a group of linked locations 30 in the buffer memory 28, but they are represented by a single entry in the EDF queue 16. The number of cells actually stored in memory per single "ensemble" representation in an EDF queue 16 will vary greatly depending on traffic characteristics. It has been shown that network traffic is highly correlated. Consequently, bursts of cells during periods of congestion are to be expected. Further, larger packets such as Internet Protocol (IP) packets are segmented into small cells before arrival. The segments of the packets constitute compressible bursts of small fixed-size cells. For example, a segmented 3000 byte packet generates a burst of 63 asynchronous transfer mode ("ATM") cells which can all be stored in one ensemble.

Figure 3:
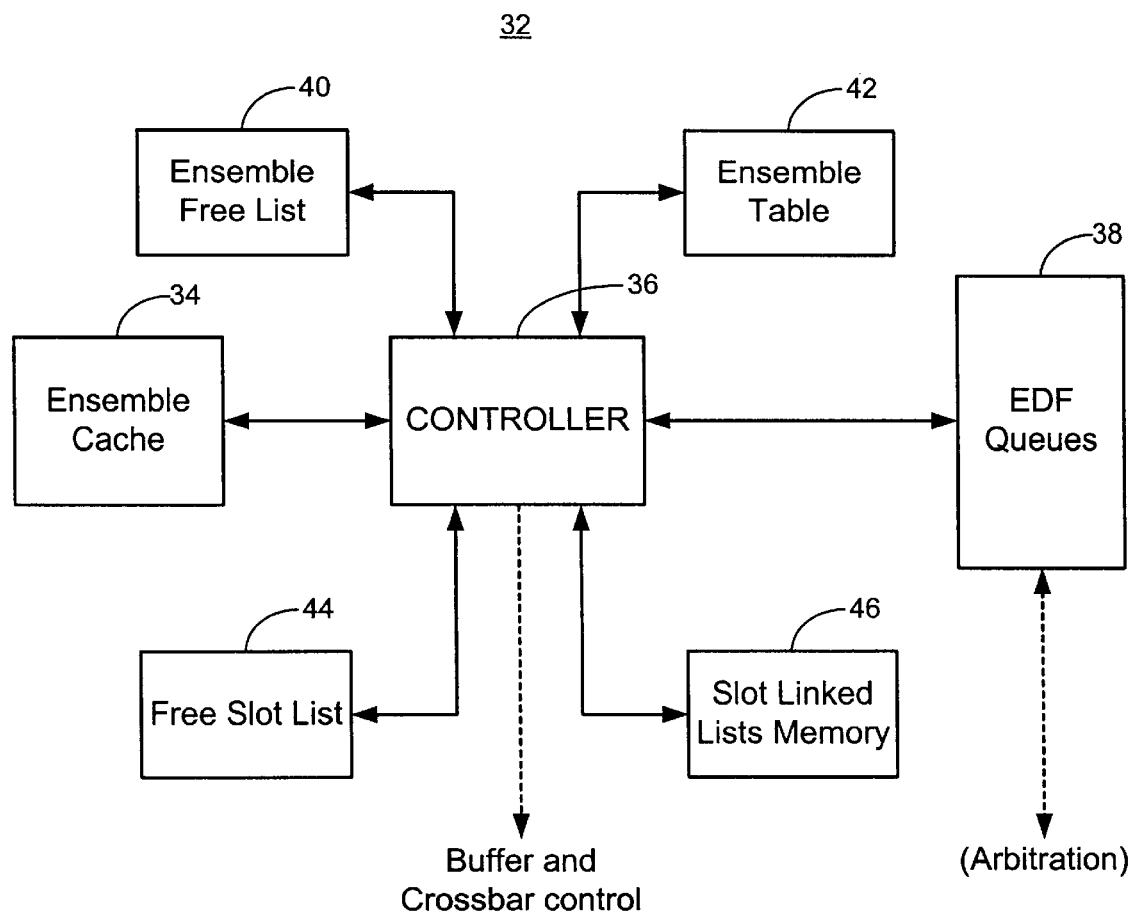
FIG. 3 is a block diagram illustrating a preferred single input system card of the present invention.

Turning now to FIG. 3, a block diagram of a preferred single-input system card of the present invention is shown and is generally indicated as 32. The card 32 of FIG. 3 serves as the architecture for multiple input queues, and is coupled to a buffer memory 28 and crossbar 20. An ensemble cache 34 maintains representations of ensembles, so newly arriving cells can be added to ensembles as is appropriate. To streamline operation, a representation is created in the ensemble cache 34 whenever a cell is received (whether or not there yet exists an appropriate representation) for a given input queue. This permits a quick check of the cache 34 to determine if a newly arrived cell should be added to an existing ensemble. Thus, in the preferred embodiment, an ensemble ID is used for single cells in an EDF queue so that newly arriving cells are easily linked to the same ensemble ID where appropriate. The organization of any ensemble preferably involves the use of an EDF queue group 38, an ensemble free list 40, an ensemble table 42, a free slot list 44, and slot linked list 46. The ensemble free list 40 keeps a list of available ensemble identification numbers (IDs) for assignment if a cell arriving from the input port 12 does not match any existing ensembles. The free slot list 44 maintains the list of free and available memory slots that can be assigned, whereas the slot linked lists memory 46 keeps records of linked lists of memory slots linked together to form cell ensembles in buffer memory 28. An ensemble is therefore actually represented by a linked list of memory slots. The ensemble table 42, indexed by ensemble IDs, also stores the length and slot addresses of head and tail of linked memory slots having entries in linked lists memory 46.

Figure 4:
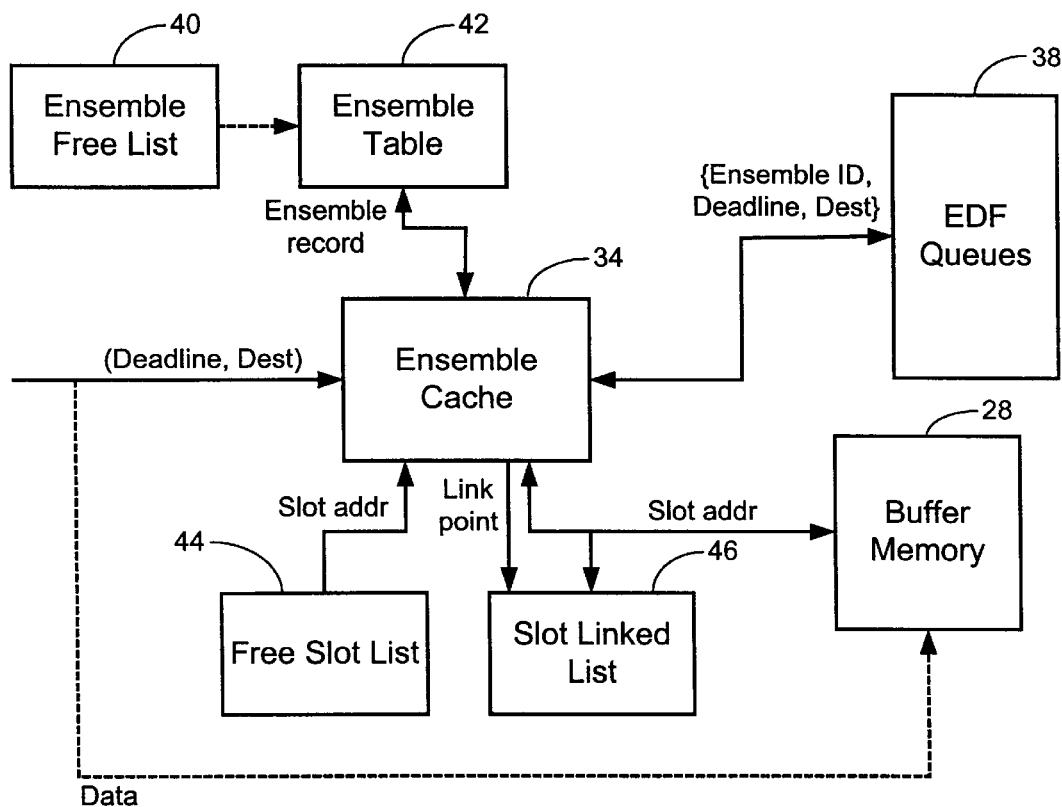
FIG. 4 is a block diagram illustrating the receiving process of the preferred input system card operation for the present invention.

FIG. 4 illustrates a receiving process of the input system card of FIG. 3. FIG. 4 illustrates flow for a single input queue 14. Flow of the process in FIG. 4 is controlled by the controller 36. When a cell arrives, its deadline and destination port are sent to the ensemble cache 34. The cache is checked for a common address, i.e., deadline and destination. In the case of a cache hit, the ensemble cache 34 specifies an existing ensemble record to be updated in the ensemble table 42. In the case of a cache miss, a free ensemble is allocated from the ensemble free list 40, a new cache entry is made in the ensemble cache 34, and a corresponding record is written to the ensemble table 42. In either case, a free slot is allocated from the free slot list 44 to the ensemble cache 34 for the cell, and is attached to the tail of the slot linked list comprising the ensemble. Now that the cell has an assigned slot, the slot address is then forwarded to the buffer memory 28. The arrived cell is stored in the buffer memory 28, and the cell's ensemble ID and deadline are pushed into an appropriate one of the EDF queues 38. The cell's ensemble ID is later used to retrieve a cell from buffer memory 28.

Figure 5:
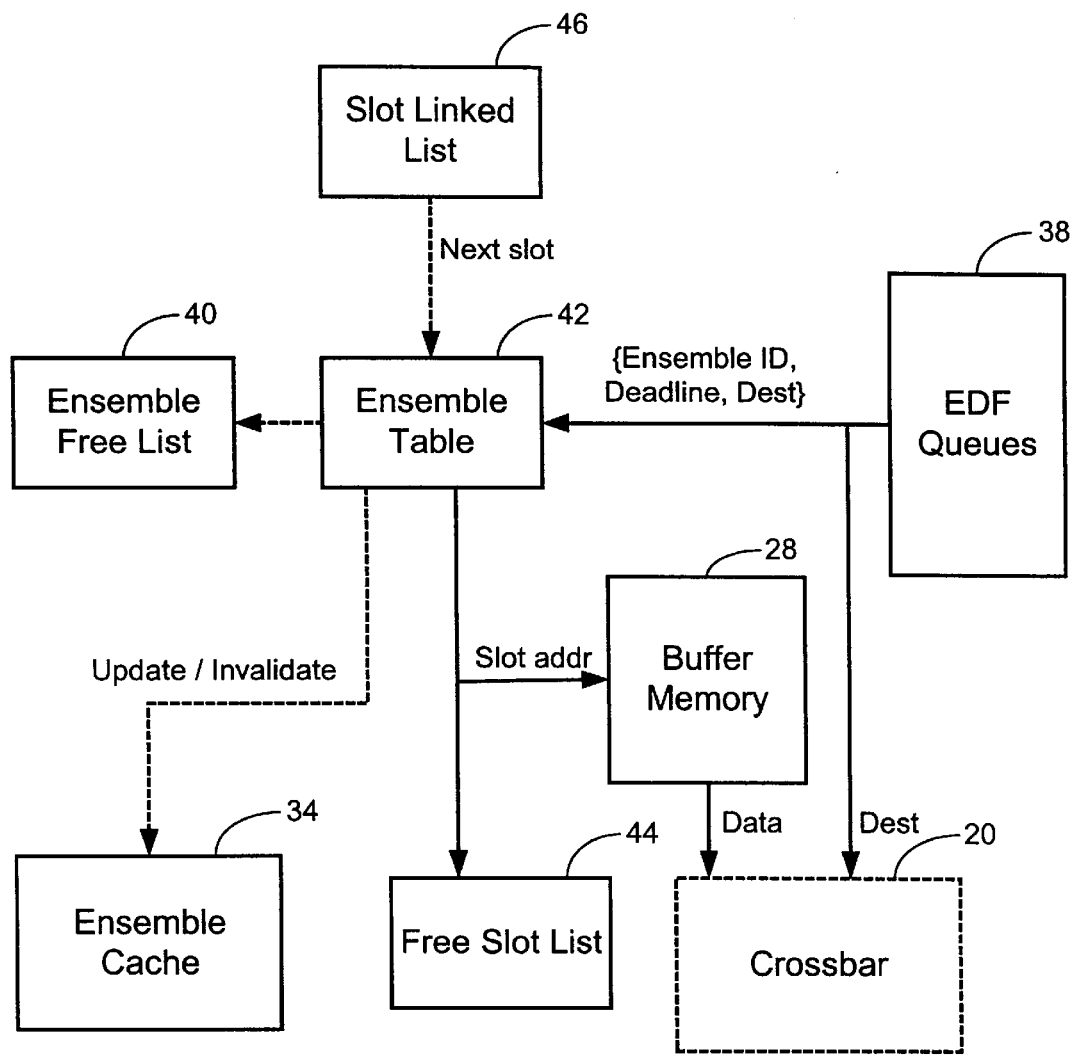
FIG. 5 is a block diagram illustrating the sending process of the preferred input system card operation for the present invention.

FIG. 5 illustrates the sending process of the single-input system card 32, as directed by the controller 36. After an ensemble is actually selected from an EDF queue for transmission to an output port, its entry is read from the EDF queue and its ensemble ID indexes the ensemble table 42. In response, the ensemble table 42 returns the slot address of the head of the slot linked list 46 comprising the ensemble to the buffer memory 28. The length field of the ensemble stored in the ensemble table 42 is decremented; and if it reaches zero, its entry is popped from the queue, the ensemble ID is recycled to the ensemble free list 40, and the cache entry, if any, in the ensemble cache 34 is also invalidated. Furthermore, the group of EDF queues 38 sends the destination of the cell to the crossbar 20.

When an EDF queue becomes full, the latest deadline (lowest priority) representation in the queue overflows and is discarded. When a latest deadline entry overflows from an EDF queue, the slots in its ensemble must be recycled to the slot free list 44. Otherwise, the memory space would be lost for future use. In the preferred embodiment overflow occurs only after an insertion into the queue; hence, there can be only one overflow because only one new cell arrives in any cycle. Overflows are stored in a small FIFO memory, and the discarded cells' slots are either reused directly for newly arriving cells, or are written to the free slot list 44.

Figure 6:
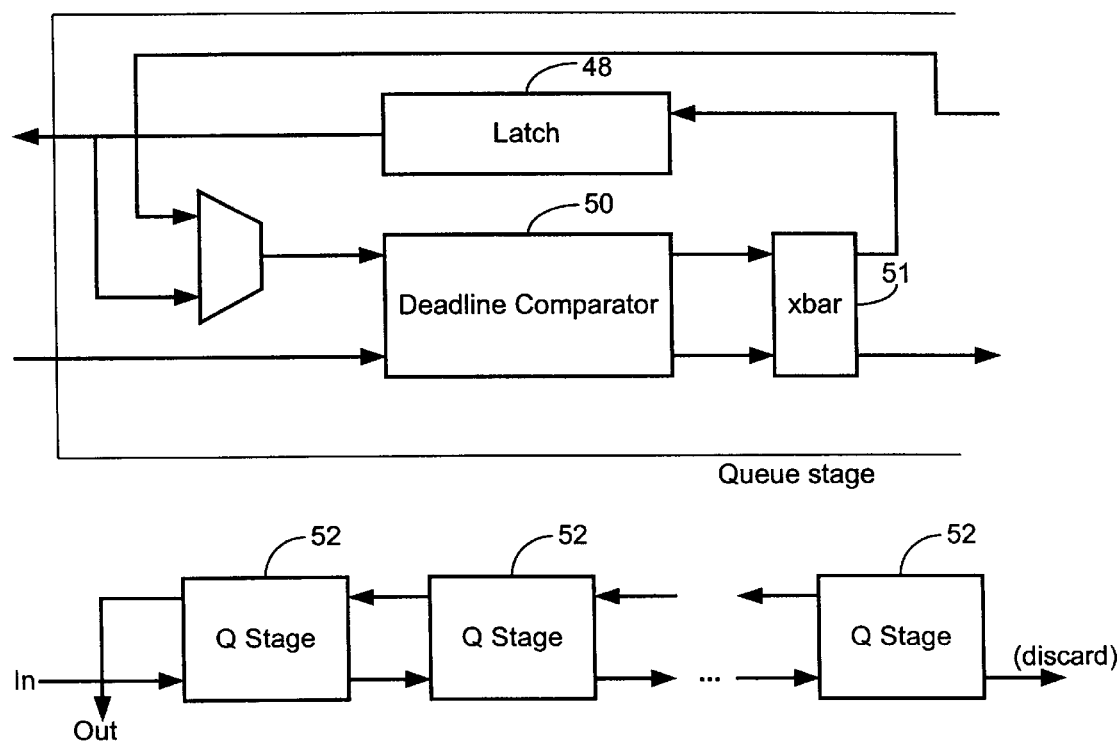
FIG. 6 illustrates a preferred staging structure of an EDF queue of the present invention.

FIG. 6 illustrates a preferred EDF queue structure, including a chain of stages for a single EDF queue designated for one output within an input queue 14. Each stage 52 contains a deadline comparator 50, a 2×2 crossbar 51, and a storage latch 48. Outputs of crossbar 51 are latched, which allows storage latches 48 to be overwritten while previous contents are sent out. As noted earlier, the earliest deadline cell representation is arranged at the head of the EDF queue 16, and the remainder of the queue is sorted in the order of increasing deadline. Control flows from the head of the queue to the tail.

Transmission of an ensemble may be interrupted by a new arrival with an earlier deadline. The ensemble's representation is then simply pushed up in the queue. When and if the representation returns to the head of the queue, transmission resumes. Similarly, new cells may be appended to an ensemble while its entry representation is anywhere in the queue, including at the head of the queue.

An EDF queue may be implemented in simple fashion, as seen in FIG. 6, with three commands of insert, extract and shift. The insert command is used during the insertion of a new cell into the queue. A new cell's representation is inserted first into the head of the queue. As mentioned above, the invention may be practiced with EDF queues holding cells themselves, as well. Cells may be handled in the same manner as cell representations. The deadline of a new cell is compared to that of the entry at the head of the queue, if any. If the new cell has an earlier deadline, the existing cell representation is shifted to the next stage of the queue, and the new cell representation is stored. Otherwise, the new cell representation is inserted into the next stage, leaving the existing cell representation at the head of the queue. Thus, between two cells having the same deadline, a first in first out order is maintained. An identical process is conducted at each stage until the new cell representation is either stored in a stage or reaches the end of the queue, in which case it is discarded. The shift command is used to move existing representations of cells one stage closer to the end of the queue. A shift occurs when a new cell representation displaces an existing cell representation. The shift begins at the stage experiencing a displacement and continues toward the tail of the queue until an empty stage is encountered, or otherwise until the end of the queue. If the end of the queue is reached, the last cell representation in the queue is discarded, having been sacrificed in favor of the new cell representation. The shift operation maintains the orderings, both EDF and FIFO of cell representations in the EDF queues. There can be more than one representation with the same deadline because the cache is not guaranteed to have an entry for every ensemble in the queue, and because ensembles have length limits. A new but equivalent ensemble will be formed if a cache entry is displaced from the cache or if the ensemble reaches maximum length. The extract command is used to remove a cell representation from the queue in preparation for transmission. Extracting the cell representation from the head of the queue causes the remaining cell representations stored in the queue to be shifted one stage toward the head of the queue. The insert and extract commands may be active simultaneously.

Accordingly, the incoming cell representation is pushed toward the tail of the queue until it has passed those cell representations that have equal or earlier deadline. By ensuring that the incoming cells are arranged (through their representations) toward the tail of the queue, specifically behind cells that may have the same deadline, FIFO order is maintained. When a newly arrived cell representation is placed at the head of the queue, it is immediately available for switching.

Because of the given queue architecture of the present invention, the cycle time is independent of the queue length for two reasons. First, incoming cells are inserted at the head of the queue to ensure a single comparison between the incoming cell and the stored cell at the head of the queue for determining the earliest cell deadline. Second, the queue is pipelined so that operations on the queue need not propagate from head to tail in a single cycle. Pipelining prevents operations initiated in cycle i from corrupting operations initiated in cycles i–1, i–2, . . .

Figure 7:
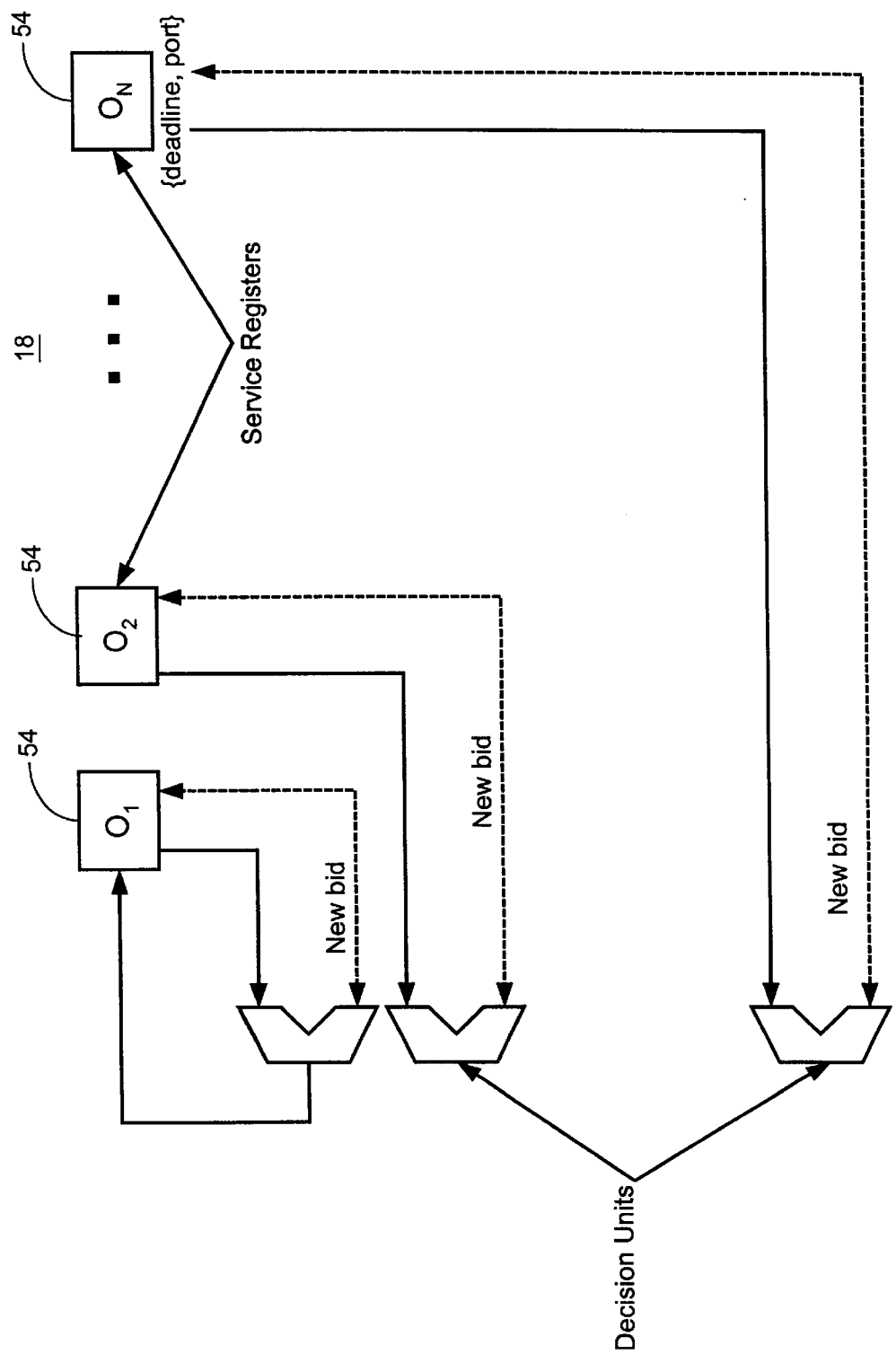
FIG. 7 illustrates a preferred central arbiter of the preferred embodiment of the present invention.

FIG. 7 illustrates a central arbiter 18 of the preferred embodiment of the present invention. The central arbiter 18 is responsible for coordinating a conflict-free matching between the input ports and the output ports, as discussed with respect to FIG. 1 above. This type of matching enables cells with the earliest possible deadline to be sent from each input queue. The earliest possible deadline, for a given input queue, may not be the earliest deadline in that queue since another input may have earlier deadline cells for an output port. The arbiter 18 maintains a register 54 with service port and deadline for each output port 22. The arbiter 18 also stores bids received from each input. In order to acquire a lock for an output port, an input queue must make a bid with earlier or simultaneous deadline. If there is a bid for simultaneous deadlines, a delay counter may be used to prevent the lock from being re-acquired immediately. In the steady state, each EDF queue will bid until it minimizes the deadline of its transmitted cells. An EDF queue may have cells with earlier deadlines, but the destination ports of those cells are locked by other EDF queues that are already transmitting cells with earlier deadlines. Since the switch is input buffered and an input port can send to only one output port for each cycle, an output port is not guaranteed to receive traffic with the earliest available deadline. The cells in question may be blocked by more urgent cells originating at the same input but destined for another output.

Unconstrained bidding could require comparison of many contenders in a single cycle. In order to reduce complexity, it is preferred that each input is allowed to bid only for a specified port in each cycle, which requires only one comparison to select a winner for each outport port. A simple rotating scheme is used such that each input port is allowed to bid for a unique output port in a given cycle, specifically for an N×N switch, in cycle k input i is allowed to bid for output (i+k)mod N. Outputs that remain unmatched following this process may subsequently be paired with available inputs using a simple deadline-independent fixed-priority or round-robin matching. Because of the heuristic arbitration scheme, new cells with very early deadlines may be delayed up to N cycles awaiting an opportunity to bid for transmission service. For intended switches in use of the present cell switching architecture, the delay is negligible. However, other schemes can be used for the central arbiter and are within the scope of the invention, including but not limited to allowing multiple bids per input queue or allowing multiple EDF queues from a single input queue to have winning bids in one cycle.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A cell switching architecture comprising:
   a plurality of input ports;
   a plurality of output ports, each capable of serving as a destination port for cells from any one of said plurality of input ports; and
   an input queue for each of the said plurality of input ports for receiving cells from a respective input port, each input queue having an earliest-deadline-first queue per output port for arranging cells from said plurality of input ports according to deadline, each said earliest-deadline-first queue arranging cells for a single output port.

2. The cell switching architecture according to claim 1, wherein a newly arrived cell is initially arranged at the head of an EDF queue and then is arranged into the EDF queue according to its deadline.

3. The cell switching architecture according to claim 1, further comprising a buffer memory, said buffer memory storing cells arranged by said EDF queues, each of said EDF queues arranging cells by storing a cell representation including an identification (ID) indicative of a memory location in said memory and a deadline value associated with a cell stored in the memory location.

4. The cell switching architecture according to claim 3, wherein multiple cells having a common deadline are arranged in an EDF queue with a single ID, and the multiple cells are linked together in memory as an ensemble of cells.

5. The cell switching architecture according to claim 3, wherein the ID comprises an ensemble ID, the architecture further comprising:

an ensemble cache, said ensemble cache receiving the deadline of a newly arrived cell, and storing entries indicating deadlines and destination ports of previously received cells for EDF queues; and a controller for checking the ensemble cache upon arrival of a newly arrived cell to determine whether or not there exists a cache entry having a common deadline and destination, then if there exists a cache entry having a common deadline and destination, directing the memory to store the newly arrived cell in an ensemble including another cell or cells corresponding to the cache entry, if there exists no cache entry having a common deadline and destination, creating a cache entry and ensemble ID, forwarding the ensemble ID and deadline to an appropriate individual earliest deadline first queue, and directing the memory to store the newly arrived cell as the first cell of a new ensemble in memory.

6. The cell switching architecture according to claim 5, further comprising:

an ensemble list which tracks ensembles by ensemble ID and includes information sufficient to locate ensembles stored in memory; and an ensemble free list which maintains a list of available ensemble ID's for creating an ensemble based upon a newly arrived cell when there is no cache entry having a common deadline and destination.

7. The cell switching architecture according to claim 6, wherein cells for switching in a read cycle are determined by selecting an earliest deadline cell from among cells having representations heading EDF queues corresponding to said each one of said output ports.

8. The cell switching architecture according to claim 7, further comprising an arbiter for preventing conflicting transmissions of cells in a read cycle.

9. The cell switching architecture according to claim 8, wherein said arbiter grants a bid from an input queue for a particular output port and displaces an earlier bid only if an earlier or equal deadline bid is received from another input queue.

10. The cell switching architecture according to claim 9, wherein an input queue bids for transmission using its earliest deadline cell representations until the arbiter grants a bid.

11. The cell switching architecture according to claim 10, wherein an input queue re-bids for transmission if it has a cell representation displaced.

12. A method for switching cells between a plurality of input ports and a plurality of output ports, the method comprising steps of:

accepting cells into a plurality of input queues respectively corresponding to said plurality of input ports;

sorting cells, within each respective input queue, into groups according to destination output port such that each group includes cells destined for a single output port and a group is formed for every output port for which cells are available;

arranging cells, within each group, according to deadlines; and by each output port, choosing cells to read in a read cycle from the earliest deadline cell in groups for that output port.

13. A method for compressing the contents of an earliest deadline first (EDF) queue, the method comprising steps of:

accepting a newly arrived cell;

assigning a new identification (ID) to a newly arrived cell if no current ID exists in the EDF queue that has the same deadline and destination, otherwise assigning an existing identification using a current ID having the same deadline and destination as the newly arrived cell;

sending any new IDs to the EDF queue with deadline and destination information as a cell representation to be arranged in the EDF queue; and storing cells into memory with cells having a common ID being linked together in memory.

14. A method for switching cells between a plurality of input ports and a plurality of output ports, the method comprising steps of:

accepting cells into a plurality of input queues respectively corresponding to said plurality of input ports;

sorting cells, within each respective input queue, into groups according to destination output ports such that each group includes cells destined for a single output port and a group is formed for every output port for which cells are available;

arranging cells, within each group, according to deadline; and by each output port, choosing cells in a predetermined manner to read during a read cycle.

* * * * *

UNITED STATES PATENT AND TRADEMARK OFFICE
CERTIFICATE OF CORRECTION

PATENT NO. : 6,791,992 B1
DATED : September 14, 2004
INVENTOR(S) : Yun et al.

It is certified that error appears in the above-identified patent and that said Letters Patent is hereby corrected as shown below:

<u>Title page,</u>
Item [56], References Cited, OTHER PUBLICATIONS, please delete "41Gb/s" and insert -- 40Gb/s -- therefor.

<u>Column 7,</u>
Line 64, please delete "i" and insert -- $i$ -- therefor.
Line 65, please delete "i-1, i-2" and insert -- $i\text{-}1, i\text{-}2$ -- therefor.

<u>Column 8,</u>
Line 31, please delete "NxN" and insert -- $NxN$ -- therefor.
Line 31, please delete "k" and insert -- $k$ -- therefor.
Line 31, please delete "i" and insert -- $i$ -- therefor.
Line 32, please delete "(i+k)mod N" and insert -- $(i+k) mod\ N$ -- therefor.

Signed and Sealed this

Seventh Day of June, 2005

JON W. DUDAS
*Director of the United States Patent and Trademark Office*